United States Patent

Fest et al.

[15] 3,700,686
[45] Oct. 24, 1972

[54] O-ALKYL-O-PYRAZOLYL-PHOSPHORIC, PHOSPHONIC, THIONOPHOSPHORIC AND THIONOPHOSPHONIC ACID ESTERS

[72] Inventors: Christa Fest, Wuppertal-Elberfeld; Ingeborg Hammann; Wolfgang Behrenz, both of Cologne, all of Germany

[73] Assignee: Farbenfabriken Bayer Aktiengesellschaft, Leverkusen, Germany

[22] Filed: March 5, 1970

[21] Appl. No.: 16,934

[30] Foreign Application Priority Data

March 14, 1969 Germany..........P 19 12 972.7

[52] U.S. Cl.................................260/310 R, 424/200
[51] Int. Cl............................C07d 49/18, C07f 9/40
[58] Field of Search..................................260/310 R

[56] References Cited

UNITED STATES PATENTS

| | | | |
|---|---|---|---|
| 2,754,244 | 7/1956 | Gysin et al. | 260/310 R |
| 3,216,894 | 11/1965 | Lorenz et al. | 260/310 R |
| 3,232,830 | 2/1966 | Schrader et al. | 260/310 R |

FOREIGN PATENTS OR APPLICATIONS

| | | | |
|---|---|---|---|
| 300,741 | 10/1954 | Switzerland | 260/310 R |
| 300,758 | 10/1954 | Switzerland | 260/310 R |

OTHER PUBLICATIONS

Abramov et al., J. Gen. Chem. (USSR) Vol. 38, Page 2715 (1968). QD1.Z6a
Arbuzov et al., Chem. Abst., Vol. 60, Column 4127–4128 (1964). QD1.A51
Chemical and Engineering News, Vol. 30, No. 43, Pages 4513–4526 (1952, Oct. 27, 1952) TP1,I418
Zinov' Ev et al., J. Gen. Chem. (USSR) Vol. 39, pages 574–575 (1969) QD1.26

*Primary Examiner*—Natalie Trousof
*Attorney*—Burgess, Dinklage & Sprung

[57] ABSTRACT

O-alkyl-O-pyrazolyl-phosphoric, phosphonic, thionophosphoric and thionophosphonic acid esters, i.e., (alkyl, phenyl and O-alkyl)-O-alkyl-O-[1-([alkyl, phenyl and O-alkyl]-O-alkyl-[phosphoryl, phosphonyl, thionophosphoryl and thionophosphonyl])-5-methyl-pyrazol-3-yl]-phosphoric, phosphonic, thionophosphoric and thionophosphonic acid esters, which possess arthropodicidal, especially acaricidal and insecticidal, properties, and which may be produced by conventional methods.

10 Claims, No Drawings

O-ALKYL-O-PYRAZOLYL-PHOSPHORIC, PHOSPHONIC, THIONOPHOSPHORIC AND THIONOPHOSPHONIC ACID ESTERS

The present invention relates to and has for its objects the provision for particular new O-alkyl-O-pyrazolylphosphoric, phosphonic, thionophosphoric and thionophosphonic acid esters, i.e., (alkyl, phenyl and O-alkyl)-O-alkyl-O-[1-([alkyl, phenyl and O-alkyl]-O-alkyl-[phosphoryl, phosphonyl, thionophosphoryl and thionophosphonyl])-5-methyl-pyrazol-3-yl]-phosphoric, phosphonic, thionophosphoric and thionophosphonic acid esters, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combatting pests, e.g., arthropods, especially insects and acarids, with other and further objects becoming apparent from a study of the within specification and accompanying examples.

O,O-dialkyl-O-(3-methyl-pyrazol-5-yl)-phosphoric or -thiono-phosphoric acid esters, such as O,O-dimethyl-O-(3-methyl-pyrazol-5-yl)-thionophosphate (A) and O,O-diethyl-O-(3-methyl-pyrazol-5-yl)-thionophosphate (B), are already described in U.S. Pat. No. 2,754,244 as insecticides and acaricides. These known compounds can be prepared, for example, by reaction of equimolar amounts of the appropriate O,O-dialkyl-(thiono)-phosphoric acid ester chlorides and 5-methyl-3-hydroxy-pyrazole.

It has now been found, in accordance with the present invention, that the particular new phosphorus acid esters, i.e., O-alkyl-O-pyrazolyl-phosphoric, phosphonic, thionophosphoric and thionophosphonic acid esters, of the formula

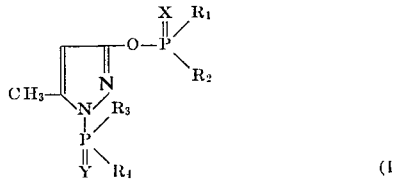

(I)

in which
$R_1$ and $R_3$ each individually is alkoxy of 1 to 4 carbon atoms,
$R_2$ and $R_4$ each individually is alkyl of 1 to 4 carbon atoms, alkoxy of 1 to 4 carbon atoms, or phenyl, and
X and Y each individually is oxygen or sulfur, exhibit strong arthropodicidal, especially insecticidal and acaricidal, properties.

It has been furthermore found, in accordance with the present invention, that the particular new compounds of formula (I) above may be produced by a process which comprises reacting a phosphorus acid ester halide, i.e., a phosphoric, phosphonic, thionophosphoric or thionophosphonic acid diester halide of the formula

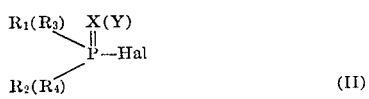

(II)

in which
$R_1$ and $R_2$ (or $R_3$ and $R_4$), and X (or Y) are the same as defined above, and Hal is a halo atom such as chloro, bromo, iodo or fluoro, especially chloro,
with 5-methyl-3-hydroxy-pyrazole (III) in the presence of an acid-binding agent.

Surprisingly, the particular new compounds of formula (I) above according to the present invention are distinguished by outstanding insecticidal and acaricidal properties. The instant compounds possess an excellent activity against biting as well as sucking insects. The compounds according to the present invention are clearly distinguished from and superior in effectiveness to the known compounds of analogous constitution and the same type of activity, such as compounds (A) and (B) noted above. The instant compounds also possess a considerably lower toxicity to warm-blooded animals than such close known compounds. The instant compounds according to the present invention therefore represent a valuable contribution to the art.

The course of the production process according to the present invention is illustrated in greater detail by the following reaction scheme:

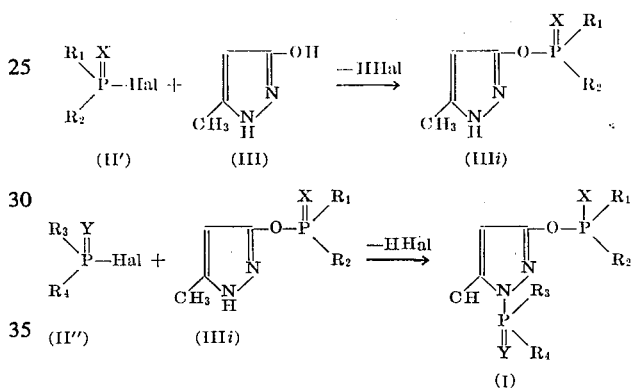

in which $R_1$, $R_2$, $R_3$, $R_4$, X, Y and Hal are the same as defined above.

The phosphorus acid ester halides and the methyl-hydroxy-pyrazole which may be used as starting materials are clearly characterized by formulas (II) and (III) noted above.

Advantageously, in accordance with the present invention, in the various formulas herein:
$R_1$ and $R_3$ each individually represents
  straight and branched chain lower alkoxy of one to four carbon atoms such as methoxy, ethoxy, n- and iso-propoxy, n-, iso-, sec.- and tert.-butoxy, and the like, especially $C_{1-3}$ or $C_{1-2}$ alkoxy;
$R_1$ and $R_4$ each individually represents
  straight and branched chain lower alkyl hydrocarbon of 1 to 4 carbon atoms such as methyl, ethyl, n- and iso-propyl, n-, iso-, sec.- and tert.-butyl, and the like, especially $C_{1-3}$ or $C_{1-2}$ alkyl;
  straight and branched chain lower alkoxy of 1 to 4 carbon atoms such as methoxy to tert.-butoxy inclusive as defined above, and the like, and especially $C_{1-3}$ or $C_{1-2}$ alkoxy; or phenyl; and
X and Y each individually represents
  oxygen; or
  sulfur.

Preferably, $R_1$ and $R_3$ each individually is $C_{1-3}$ or $C_{1-2}$ alkoxy; $R_2$ and $R_4$ each individually is $C_{1-3}$ or $C_{1-2}$ alkyl; or $C_{1-3}$ or $C_{1-2}$ alkoxy; or phenyl; and X and Y each individually is oxygen; or sulfur.

In particular, $R_1$ and $R_3$ each individually is $C_{1-2}$ alkoxy; $R_2$ and $R_4$ each individually is $C_{1-2}$ alkyl; or $C_{1-2}$ alkoxy; or phenyl; and X and Y each individually is oxygen; or sulfur.

The starting compounds of formulas (II) and (III) above are known form the literature and are readily accessible, even on an industrial scale.

As already mentioned above, when carrying out the production reaction according to the present invention, preferably the free 5-methyl-3-hydroxy-pyrazole compound (III) is used, and the reaction is caused to proceed in the presence of an acid-binding agent. For this purpose, practically all customary acid acceptors can be used. Particularly suitable, however, have proved to be alkali metal alcoholates and carbonates, such as sodium or potassium methylate, ethylate and carbonate; tertiary aliphatic, aromatic or heterocyclic amines, for example triethylamine, dimethylaniline, dimethylbenzylamine or pyridine; and the like.

The production process is preferably carried out in the presence of a solvent (this term includes a mere diluent). As such, practically all inert organic solvents, or mixtures thereof, are suitable, such as hydrocarbons, for example benzine, benzene, chlorobenzene and xylene; ethers, for example diethyl ether, di-n-butyl ether and dioxan; ketones, for example acetone, methylethyl ketone, methylisopropyl ketone and methylisobutyl ketone; and the like. However, particularly good results have been obtained also with low-boiling aliphatic alcohols, for example methanol and ethanol, and especially with nitriles, for example acetonitrile and propionitrile, as well as with dimethyl formamide.

When carrying out the reaction according to the instant production process, the reaction temperature can be varied within a fairly wide range. In general, the reaction is carried out at substantially between about 30° to 7°C.

The reactants and the auxiliary agents (i.e., acid-binding agents) are generally used in equimolar amounts.

In the case where the radicals $R_1$ and $R_3$, or $R_2$ and $R_4$, are the same, and X is the same as Y, 2 mols of the corresponding phosphoric, phosphonic or thiono-phosphoric (-phosphonic) acid ester halide of formula (II) above are used advantageously per mol of the 5-methyl-3-hydroxy-pyrazole. Otherwise, first 1 mol of ester halide of the formula

(II′)

is added dropwise, with stirring, to the 5-methyl-3-hydroxy-pyrazole and later, for example after several hours, 1 mol of ester halide of the formula

(II″)

is added to the reaction mixture.

After combining the reactants, it is advantageous to continue stirring the mixture (for example for at least 3 to 7 hours) until the reaction is substantially complete. The process products, i.e., active compounds, are then obtained with particularly good yields and in greater purity.

The phosphoric, phosphonic or thiono-phosphoric (-phosphonic) acid esters of formula (I) above according to the present invention are in some cases obtained in the form of colorless to yellow-colored, viscous, water-insoluble oils which, by so-called "slight distillation" (that is, longer heating to moderately elevated temperatures under reduced pressure) can be freed from the last volatile components and can in this way be purified. Some of these products are also crystallizable compounds which can be well purified by recrystallization from the customary solvents.

Advantageously, as already mentioned above, the particular new compounds according to the present invention are distinguished by an outstanding insecticidal and acaricidal effectiveness as well as a distinct herbicidal (pre-emergence) and rodenticidal side-effect. The effect sets in rapidly and is long-lasting. The instant compounds possess only a low phytotoxicity and a concomitantly low mammalian toxicity. For this reason, the active compounds according to the present invention can be applied with marked success in crop protection endeavors and in hygiene practices for the control of noxious sucking and eating insects and Diptera as well as, there and in the veterinary medical field, for the control of mites (Acarina).

Particularly to be emphasized in this connection is the excellent effectiveness of the instant compounds against phosphoric-acid-ester-resistant strains of spider mites.

When applied against household pests and pests of stored products, particularly flies, and mosquitoes, the particular new compounds of the present invention are also distinguished by an outstanding residual activity on wood and clay, as well as a good stability to alkali on limed substrates.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*); further, the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*) the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and Nephotettix bipunctatus; and the like.

In the case of the biting insects contemplated herein, above all there should be mentioned butterfly caterpillars (Lepidoptera) such as the diamond-back moth (*Plutella maculipennis*), the gipsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), further, the ermine moth (*Hyponomeuta padella*), the Mediterranean flour moth (*Ephestia Kühniella*) and greater wax moth (*Galleria mellonella*); and the like.

Also to be classed with the biting insects contemplated herein are beetles (Coleoptera), for example the granary weevil (*Sitophilus granarius* = *Calandra granaria*) the Colorado beetle *Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius* = *Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), but also species living in the soil, for example wireworms (*Agriotes* spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius* = *Tetranychus althaeae* or *Tetranychus urticae*) and the European red mite (*Paratetranychus pilosus* = *Panonychus ulmi*), blister mites, for example the current blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

The active compounds according to the instant invention can be utilized, if desired, in the form of the usual formulations or compositions with conventional inert (i.e., plant compatible or herbicidally inert) pesticide diluents or extenders, i.e., diluents or extenders of the type usable in conventional pesticide formulations or compositions, e.g., conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols, (e.g., glycol monomethyl ether, etc.), amides (e.g., dimethyl formamide, etc.), sulfoxides (e.g., dimethyl sulfoxide, etc.), ketones (e.g., acetone, etc.) and/or water; as well as inert dispersible finely divided solid carriers, such as ground natural minerals (e.g., kaolins, alimina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.00001–20 percent, preferably 0.01–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.00001–95 percent, and preferably 0.01–95 percent, by weight of the mixture.

The active compounds can also be used in accordance with the well known ultra-low-volume process with good success, i.e., by applying such compound if normally a liquid, or by applying a liquid composition containing the same, via very effective atomizing equipment, n finely divided form, e.g., average particle diameter of from 50–100 microns, or even less, i.e., mist form, for example by airplane crop spraying techniques. Only up at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of active compound or even the 100 percent active substance alone, e.g., about 20–100 percent by weight of the active compound.

Furthermore, the present invention contemplates methods of selectively killing, combating or controlling pests, e.g., arthropods, i.e., insects and acarids, weeds (especially by pre-emergence technique), and rodents, and more particularly methods of combating at least one of insects and acarids which comprises applying to at least one of correspondingly (a) such insects, (b) such acarids, and (c) the corresponding habitat thereof, i.e., the locus to be protected, a correspondingly combative or toxic amount, i.e., an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Plutella test
Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dew moist and are then infested with caterpillars of the diamond-back moth (*Plutella maculipennis*).

After the specified period of time, the degree of destruction is determined as a percentage: 100 percent means that all the caterpillars are killed, whereas 0 percent means that none of the caterpillars are killed.

1. particular active compounds tested, their concentrations the evaluation time and the results obtained can be seen from the following Table 1.

TABLE 1

Plutella test

| Active compound (constitution) | Concentration of active compound in percent | Degree of destruction in percent after 3 days |
| --- | --- | --- |
| (A) 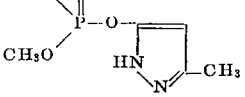 (Known from U.S. Patent 2,754,244). | 0.1 | 0 |
| (B) 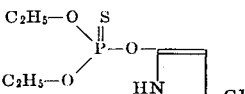 (Known from U.S. Patent 2,754,244). | 0.1 / 0.01 | 100 / 0 |
| (1₁) 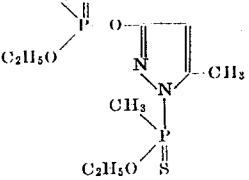 | 0.1 / 0.01 | 100 / 100 |
| (2₁) 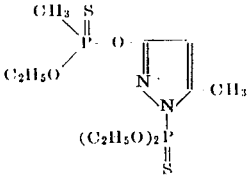 | 0.1 / 0.01 | 100 / 100 |
| (3₁) 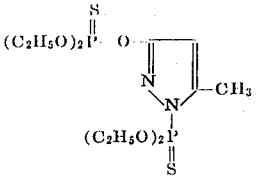 | 0.1 / 0.01 | 100 / 100 |
| (4₁) 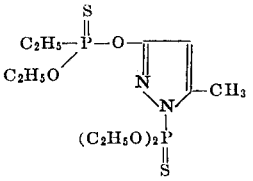 | 0.1 / 0.01 | 100 / 100 |
| (5₁) 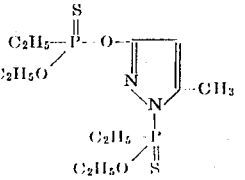 | 0.1 / 0.01 | 100 / 100 |

TABLE 1 — Continued
Plutella test

| Active compound (constitution) | Concentration of active compound in percent | Degree of destruction in percent after 3 days |
|---|---|---|
| (6₁) [structure: phenyl-P(=S)(OC₂H₅)-O-pyrazole-CH₃ with N-CH₂-P(=S)(OC₂H₅)] | 0.1 / 0.01 | 100 / 100 |
| (7₁) [structure: phenyl-P(=S)(OC₂H₅)-O-pyrazole-CH₃ with N-P(=S)(C₂H₅)(OC₂H₅)] | 0.1 / 0.01 | 100 / 80 |
| (8₁) [structure: (C₂H₅)(C₂H₅O)P(=S)-O-pyrazole-CH₃ with N-P(=O)(OC₂H₅)₂] | 0.1 / 0.01 | 100 / 100 |
| (9₁) [structure: phenyl-P(=O)(OC₂H₅)-O-pyrazole-CH₃ with N-P(=O)(OC₂H₅)₂] | 0.1 / 0.01 | 100 / 100 |
| (10₁) [structure: (C₂H₅O)₂P(=O)-O-pyrazole-CH₃ with N-P(=O)(OC₂H₅)₂] | 0.1 / 0.01 | 100 / 80 |
| (11₁) [structure: (CH₃)(C₂H₅O)P(=S)-O-pyrazole-CH₃ with N-P(=O)(OC₂H₅)₂] | 0.1 / 0.01 | 100 / 100 |

EXAMPLE 2

Myzus test (contact action)
Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage plants (*Brassica oleracea*) which have been heavily infested with peach aphids (*Myzus persicae*) are sprayed with the preparation of the given active compound until dripping wet.

After the specified period of time, the degree of destruction is determined as a percentage: 100 percent means that all the aphids are killed, whereas 0 percent means that none of the aphids are killed.

The particular active compounds tested, their concentrations, the evaluation time and the results obtained can be seen from the following Table 2.

TABLE 2
Myzus test

| Active compound | Concentration of active compound in percent | Degree of destruction in percent after 24 hours |
|---|---|---|
| (A) [structure: (CH₃O)₂P(=S)-O-pyrazole-CH₃ with N-H] (Known from U.S. Patent 2,754,244) | 0.1 | 0 |
| (1₂) [structure: (CH₃)(C₂H₅O)P(=S)-O-pyrazole-CH₃ with N-P(=S)(CH₃)(OC₂H₅)] | 0.1 / 0.01 / 0.001 | 100 / 100 / 60 |
| (2₂) [structure: (CH₃)(C₂H₅O)P(=S)-O-pyrazole-CH₃ with N-P(=S)(OC₂H₅)₂] | 0.1 / 0.01 | 100 / 100 |
| (12₁) [structure: (CH₃)(C₂H₅O)P(=S)-O-pyrazole-CH₃ with N-P(=S)(C₂H₅)(OC₂H₅)] | 0.1 / 0.01 / 0.001 | 100 / 100 / 30 |
| (3₂) [structure: (C₂H₅O)₂P(=S)-O-pyrazole-CH₃ with N-P(=S)(OC₂H₅)₂] | 0.1 / 0.01 | 100 / 95 |
| (4₂) [structure: (C₂H₅)(C₂H₅O)P(=S)-O-pyrazole-CH₃ with N-P(=S)(OC₂H₅)₂] | 0.1 / 0.01 | 100 / 100 |
| (5₂) [structure: (C₂H₅)(C₂H₅O)P(=S)-O-pyrazole-CH₃ with N-P(=S)(C₂H₅)(OC₂H₅)] | 0.1 / 0.01 | 100 / 95 |
| (6₂) [structure: phenyl-P(=S)(OC₂H₅)-O-pyrazole-CH₃ with N-P(=S)(CH₃)(OC₂H₅)] | 0.1 / 0.01 | 100 / 100 |

TABLE 2 — Continued
Myzus test

| Active compound | Concentration of active compound in percent | Degree of destruction in percent after 24 hours |
|---|---|---|
| ($7_2$) — Structure: $C_6H_5$ and $C_2H_5O$ attached to P(=S), linked via O to pyrazole ring (with $CH_3$), N substituted with $P(=S)(OC_2H_5)(C_2H_5)$ | 0.1<br>0.01 | 100<br>65 |
| ($13_1$) — $(C_2H_5O)_2P(=S)$—O—pyrazole—$CH_3$; N substituted with $P(=S)(OC_2H_5)(C_6H_5-CH_2)$ | 0.1 | 90 |
| ($8_2$) — $C_2H_5$, $C_2H_5O$ on P(=S)—O—pyrazole—$CH_3$; N substituted with $(C_2H_5O)_2P(=O)$ | 0.1<br>0.01 | 100<br>99 |
| ($14_1$) — $C_6H_5$, $C_2H_5O$ on P(=S)—O—pyrazole—$CH_3$; N substituted with $(C_2H_5O)_2P(=O)$ | 0.1<br>0.01 | 100<br>100 |
| ($10_2$) — $(C_2H_5O)_2P(=O)$—O—pyrazole—$CH_3$; N substituted with $(C_2H_5O)_2P(=O)$ | 0.1<br>0.01<br>0.001 | 100<br>100<br>30 |
| ($11_2$) — $CH_3$, $C_2H_5O$ on P(=S)—O—pyrazole—$CH_3$; N substituted with $(C_2H_5O)_2P(=O)$ | 0.1<br>0.01<br>0.001 | 100<br>100<br>60 |

EXAMPLE 3

Tetranychus test
Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus telarius*) in all stages of development.

After the specified period of time, the effectiveness of the preparation of the given active compound is determined by counting the dead mites. The degree of destruction thus obtained is expressed as a percentage: 100 percent means that all the spider mites are killed, whereas 0 percent means that none of the spider mites are killed.

The particular active compounds tested, their concentrations, the evaluation time and the results obtained can be seen from the following Table 3.

TABLE 3

| Active compound | Concentration of active compound in percent | Degree of destruction in percent after 48 hours |
|---|---|---|
| (A) — $(CH_3O)_2P(=S)$—O—pyrazole(NH)—$CH_3$ (Known from U.S. Patent 2,754,244) | 0.1 | 0 |
| (B) — $(C_2H_5O)_2P(=O)$—O—pyrazole(NH)—$CH_3$ (Known from U.S. Patent 2,754,244) | 0.1 | 0 |
| ($1_3$) — $CH_3$, $C_2H_5O$ on P(=S)—O—pyrazole—$CH_3$; N substituted with $P(=S)(CH_3)(OC_2H_5)$ | 0.1<br>0.01 | 100<br>95 |
| ($2_3$) — $CH_3$, $C_2H_5O$ on P(=S)—N—pyrazole—$CH_3$; substituted with $(C_2H_5O)_2P(=S)$ | 0.1<br>0.01 | 100<br>99 |
| ($12_2$) — $CH_3$, $C_2H_5O$ on P(=S)—O—pyrazole—$CH_3$; N substituted with $P(=S)(C_2H_5)(OC_2H_5)$ | 0.1<br>0.01 | 100<br>99 |
| ($3_3$) — $(C_2H_5O)_2P(=S)$—O—pyrazole—$CH_3$; N substituted with $(C_2H_5O)_2P(=S)$ | 0.1<br>0.01 | 100<br>40 |
| ($4_3$) — $C_2H_5$, $C_2H_5O$ on P(=S)—O—pyrazole—$CH_3$; N substituted with $(C_2H_5O)_2P(=S)$ | 0.1<br>0.01 | 98<br>60 |
| ($5_3$) — $C_2H_5$, $C_2H_5O$ on P(=S)—O—pyrazole—$CH_3$; N substituted with $P(=S)(C_2H_5)(OC_2H_5)$ | 0.1 | 95 |

TABLE 3 — Continued

| Active compound | Concentration of active compound in percent | Degree of destruction in percent after 48 hours |
|---|---|---|
| (6₃) Phenyl(ethoxy)thiophosphoryl-O-[pyrazole with CH₃, N-P(S)(CH₃)(OC₂H₅)] | 0.1 | 95 |
| (8₃) (C₂H₅S)(C₂H₅O)P(=O)-O-[pyrazole-CH₃, N-P(=O)(OC₂H₅)₂] | 0.1 / 0.01 | 100 / 45 |
| (14₂) Phenyl(C₂H₅O)P(=S)-O-[pyrazole-CH₃, N-P(=O)(OC₂H₅)₂] | 0.1 / 0.01 | 100 / 95 |
| (10₃) (C₂H₅O)₂P(=O)-O-[pyrazole-CH₃, N-P(=O)(OC₂H₅)₂] | 0.1 | 100 |
| (11₃) (CH₃)(C₂H₅O)P(=S)-O-[pyrazole-CH₃, N-P(=O)(OC₂H₅)₂] | 0.1 / 0.01 | 99 / 70 |

EXAMPLE 4

LT₁₀₀ test for Diptera
Test insect: *Musca domestica*
Solvent: Acetone 2 parts by weight of the particular active compound are dissolved in 1,000 parts by volume of the stated solvent. The resulting solution is diluted with further solvent to the desired lower final concentration.

2.5 ml of the solution of the given active compound are pipetted into a Petri dish. On the bottom of the Petri dish is situated a filter paper with a diameter of about 9.5 cm. The Petri dish remains uncovered until the solvent has completely evaporated. The amount of active compound per square meter of filter paper varies with the concentration of the solution of the given active compound used. About 25 test insects are then placed in the Petri dish and such dish is covered with a glass lid.

The condition of the test insects is continuously observed. The time which is necessary for a 100 percent knock down effect (i.e., lethal time) is determined.

The test insect, the particular active compounds tested, their concentrations, and the period of time at which there is a 100 percent knock down effect can be seen from the following Table 4.

TABLE 4
LT₁₀₀ test for Diptera

| Active compound | Concentration of active compound in the solution in percent | LT₁₀₀ ('=minutes) |
|---|---|---|
| (B) 3-CH₃-pyrazol-5-yl-O-P(=S)(OC₂H₅)₂, NH (Known from U.S. Patent 2,754,244) | 0.2 | 8 hours=100% |
| (A) 3-CH₃-pyrazol-5-yl-O-P(=S)(OCH₃)₂, NH (Known from U.S. Patent 2,754,244) | 0.2 | 8 hours=70% |
| (5₄) 3-CH₃-pyrazolyl-O-P(=S)(C₂H₅)(OC₂H₅), N-P(=S)(C₂H₅)(OC₂H₅) | 0.2 / 0.02 / 0.002 | 75' / 210' / 8 hours=40% |
| (4₄) 3-CH₃-pyrazolyl-O-P(=S)(C₂H₅)(OC₂H₅), N-P(=S)(OC₂H₅)₂ | 0.2 / 0.02 / 0.002 | 50' / 120' / 8 hours=80% |
| (12₃) 3-CH₃-pyrazolyl-O-P(=S)(CH₃)(OC₂H₅), N-P(=S)(C₂H₅)(OC₂H₅) | 0.2 / 0.02 | 45' / 6 hours=100% |
| (2₄) 3-CH₃-pyrazolyl-O-P(=S)(CH₃)(OC₂H₅), N-P(=S)(OC₂H₅)₂ | 0.2 / 0.02 | 115' / 6 hours=100% |
| (8₄) 3-CH₃-pyrazolyl-O-P(=S)(C₂H₅S)(OC₂H₅), N-P(=O)(OC₂H₅)₂ | 0.2 / 0.02 | 70' / 120' |
| (6₄) 3-CH₃-pyrazolyl-O-P(=S)(phenyl)(OC₂H₅), N-P(=S)(CH₃)(OC₂H₅) | 0.2 / 0.02 | 100' / 8 hours=80% |
| (7₃) 3-CH₃-pyrazolyl-O-P(=S)(phenyl)(OC₂H₅), N-P(=S)(C₂H₅)(OC₂H₅) | 0.2 / 0.02 | 100' / 8 hours=80% |

EXAMPLE 5

Mosquito larvae test
Test insect: *Aedes aegypti*
Solvent: 99 parts by weight acetone
Emulsifier: 1 part by weight benzylhydroxydiphenyl polyglycol ether To produce a suitable preparation of the particular active compound, 2 parts by weight of such active compound are dissolved in 1,000 parts by volume of the stated solvent containing the stated amount of emulsifier, and the resulting solution is diluted with water to the desired final lower concentration.

The aqueous preparations of the given active compounds are placed in glass vessels and about 25 mosquito larvae are then placed in each glass vessel.

After 24 hours, the degree of destruction is determined as a percentage. 100 percent means that all the larvae are killed, whereas 0 percent means that no larvae at all are killed.

The particular active compounds tested, their concentrations, the test insects and the results obtained can be seen from the following Table 5.

TABLE 5
Mosquito larvae test

| Active compound | Concentration of active compound in the solution in p.p.m. | Degree of destruction in percent |
| --- | --- | --- |
| (B) [structure] (Known from U.S. Patent 2,754,244). | 10<br>1 | 100<br>0 |
| (A) [structure] (Known from U.S. Patent 2,754,244). | 10 | 0 |
| (5₅) [structure] | 1 | 100 |
| (4₅) [structure] | 1 | 100 |
| (12₄) [structure] | 1 | 100 |
| (2₅) [structure] | 1 | 100 |
| (8₅) [structure] | 1 | 100 |
| (6₅) [structure] | 1 | 100 |
| (14₃) [structure] | 1 | 100 |

The following further Examples are set forth to illustrate, without limitation, the manner of producing the instant compounds according to the present invention.

EXAMPLE 6

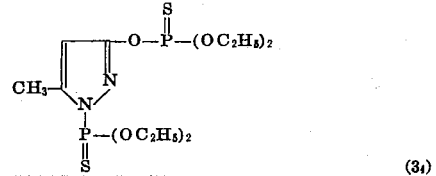

(3₁)

30 g (0.3 mol) of 2-methyl-4-hydroxy-pyrazole are dissolved in 250 ml of acetonitrile, and to this solution are added 60 g (0.6 mol) of triethylamine. During the subsequent addition of 116 g (0.6 mol) of O,O-diethyl-thionophosphoric acid ester chloride, the temperature of the mixture rises. The reaction mixture is heated to 60°C for a further 3 hours and stirred overnight at room temperature. The mixture is then taken up in chloroform and the chloroform solution is washed with water. After drying of the organic phase, the reaction product is slightly distilled under greatly reduced pressure and 96 g (80 percent of the theory) of the compound of the above formula with the refractive index $n_D^{25} = 1.5372$, are obtained.

Analysis:
Calculated for $C_{12}H_{24}N_2O_5P_2S_2$: N 7.14
(molecular weight 402)
Found: N 6.98

EXAMPLE 7

In analogous manner to that of example 6, the following compounds are obtained:

(a) 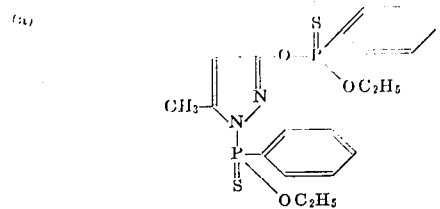
(15₁)

Yield: 89 percent of the theory; refractive index $n_D^{25}$ = 1.5887

| Analysis: | N | P |
|---|---|---|
| Calculated for $C_{20}H_{24}N_2O_3P_2S_1$: (molecular weight 466) | 6.02 % | 13.29 % |
| Found: | 6.67 % | 13.13 % |

(b) 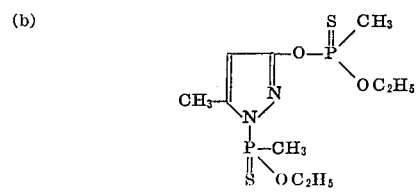
(1₄)

Yield: 86 percent of the theory; refractive index $n_D^{25}$ = 1.5523

(c) 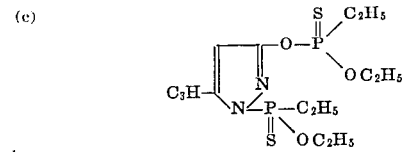
(5₆)

Yield: 84 percent of the theory, refractive index: $n_D^{25}$ = 1.5239

| Analysis: | N | P |
|---|---|---|
| Calculated for $C_{12}H_{24}N_2O_3P_2S$: (molecular weight 370) | 7.57 % | 16.75 % |
| Found: | 7.69 % | 15.96 % |

(d) 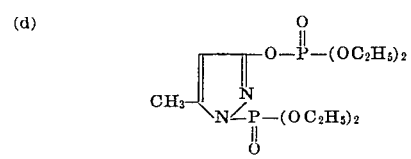
(10₄)

Yield: 54 percent of the theory

| Analysis: | P |
|---|---|
| Calculated for $C_{12}H_{24}N_2O_7P$: (molecular weight 370) | 16.75 % |
| Found: | 16.29 % |

(e) 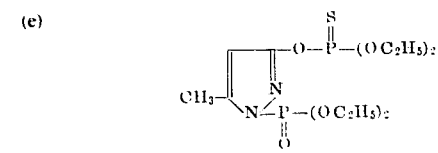
(16₁)

Yield: 79 percent of the theory

| Analysis: | S |
|---|---|
| Calculated for $C_{12}H_{24}N_2O_6P_2S$: (molecular weight 386) | 8.29 %; |
| Found: | 9.10 % |

(f) 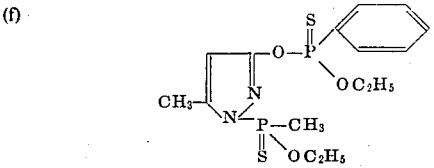
(6₆)

Yield: 86 percent of the theory; refractive index: $n_D^{25}$ = 1.5673

| Analysis: | P |
|---|---|
| Calculated for $C_{15}H_{22}N_2O_3P_2S_2$: (molecular weight 404) | 15.35 %; |
| Found: | 15.01 %. |

(g) 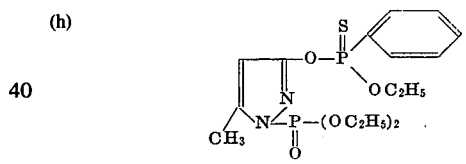
(7₄)

Yield: 85.5 percent of the theory; refractive index $n_D^{25}$ = 1.5668

| Analysis: | P |
|---|---|
| Calculated for $C_{16}H_{24}N_2O_3P_2S_2$: (molecular weight 418) | 14.82 %; |
| Found: | 14.04 %. |

(h) 
(14₄)

Yield: 84 percent of the theory; refractive index: $n_D^{25}$ = 1.5363

| Analysis: | N | P | S |
|---|---|---|---|
| Calculated for $C_{16}H_{24}N_2O_3P_2S$: (molecular weight 418) | 6.70%; | 14.82%; | 7.66%; |
| Found: | 7.22%; | 14.37%; | 8.35%. |

(i)

(12₅)

Yield: 84 percent of the theory; refractive index: $n_D^{25}$ = 1.5244

| Analysis: | N |
|---|---|
| Calculated for $C_{11}H_{22}N_2O_3P_2S_2$: (molecular weight 356) | 7.86%; |
| Found: | 7.11%. |

(j)

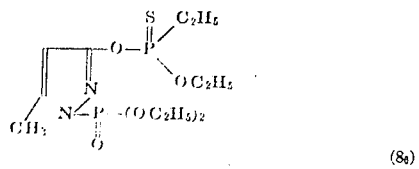

(8ₜ)

Yield: 72 percent of the theory, refractive index: $n_D^{25} = 1.5418$

| Analysis: | P | S |
|---|---|---|
| Calculated for $C_{12}H_{24}O_5N_2P_2S$: (molecular weight 370) | 16.77% | 8.65% |
| Found: | 16.59% | 8.42% |

Typical compounds of the present invention include:
1. methyl-O-ethyl-O-[1-(methyl-O'-ethyl-thionophosphonyl)-5-methyl-pyrazol-3-yl]-thionophosphonic acid ester
2. methyl-O-ethyl-O-[1(O',O'-diethyl-thionophosphoryl)-5-methyl-pyrazol-3-yl]-thionophosphonic acid ester
3. O,O-diethyl-O-[1(O',O'-diethyl-thionophosphoryl)-5-methyl-pyrazol -3-yl]-thionophosphoric acid ester
4. ethyl-O-ethyl-O-[1(O',O'-diethyl-thionophosphoryl)-5-methyl-pyrazol-3-yl]-thionophosphonic acid ester
5. ethyl-O-ethyl-O-[1(ethyl-O'-ethyl-thionophosphonyl)-5-methyl-pyrazol-3-yl]-thionophosphonic acid ester
6. phenyl-O-ethyl-O-[1-(methyl-O'-ethyl-thionophosphonyl)-5-methyl-pyrazol-3-yl]-thionophosphonic acid ester
7. phenyl-O-ethyl-O-[1-(ethyl-O'-ethyl-thionophosphonyl)-5-methyl-pyrazol-3-yl]-thionophosphonic acid ester
8. ethyl-O-ethyl-O-[1-(O',O'-diethyl-phosphoryl)-5-methyl-pyrazol 3-yl]-thionophosphonic acid ester
9. phenyl-O-ethyl-O-[1-(O',O'-diethyl-phosphoryl-5-methyl-pyrazol-3-yl]-phosphonic acid ester
10. O,O-diethyl-O-[1-(O',O'-diethyl-phosphoryl)-5-methyl-pyrazol3-yl]-phosphoric acid ester
11. methyl-O-ethyl-O-[1-(O',O'-diethyl-phosphoryl)-5-methyl-pyrazol-3-yl]-thionophosphonic acid ester
12. methyl-O-ethyl-O-[1-(ethyl-O'-ethyl-thionophosphonyl)-5-methyl-pyrazol-3-yl]-thionophosphonic acid ester
13. O,O-diethyl-O-[1-(phenyl-O'-ethyl-thionophosphonyl)-5-methyl-pyrazol-3-yl]-thionophosphoric acid ester
14. phenyl-O-ethyl-O-[1-(O',O'-diethyl-phosphoryl-5-methyl-pyrazol-3-yl]-thionophosphonic acid ester
15. phenyl-O-ethyl-O-[1-(phenyl-O'-ethyl-thionophosphonyl)-5-methyl-pyrazol-3-yl]-thionophosphonic acid ester
16. O,O-diethyl-O-[1-(O',O'-diethyl-phosphoryl)-5-methyl-pyrazol-3-yl]-thionophosphoric acid ester It will be realized that all of the foregoing compounds contemplated by the present invention possess the desired selective pesticidal, especially arthropodicidal, i.e., insecticidal or acaricidal, properties for combating insects and acarids, and that such compounds have a low phytotoxicity and a correspondingly low mammalian toxicity.

As may be used herein, the terms "arthropod," "arthropodicidal and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention which is to be limited only by the scope of the appended claims.

What is claimed is:
1. Phosphorus acid ester of the formula

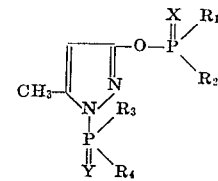

in which $R_1$ and $R_3$ each individually is alkoxy of one to four carbon atoms, $R_2$ and $R_4$ each individually is selected from the group consisting of alkyl of one to four carbon atoms, alkoxy of one to four carbon atoms and phenyl, and X and Y each individually is selected from the group consisting of oxygen and sulfur.

2. Compound according to claim 1 wherein $R_1$ and $R_3$ each individually is alkoxy of one to three carbon atoms, $R_2$ and $R_4$ each individually is selected from the group consisting of alkyl of one to three carbon atoms, alkoxy of one to three carbon atoms and phenyl, and X and Y each individually is selected from the group consisting of oxygen and sulfur.

3. Compound according to claim 1 wherein $R_1$ and $R_3$ each individually is methoxy or ethoxy, $R_2$ and $R_4$ each individually is selected from the group consisting of methyl, ethyl, methoxy, ethoxy and phenyl, and X and Y each individually is selected from the group consisting of oxygen and sulfur.

4. Compound according to claim 1 wherein such compound is methyl-O-ethyl-O-[1-(methyl-O'-ethyl-thionophosphonyl)-5- methyl-pyrazol-3-yl]-thionophosphonic acid ester of the formula

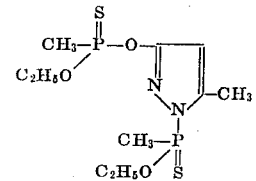

5. Compound according to claim 1 wherein such compound is methyl-O-ethyl-O-[1-(O',O'-diethyl-thionophosphoryl)-5- methyl-pyrazol-3-yl]-thionophosphonic acid ester of the formula

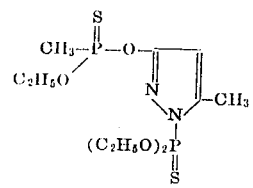

6. Compound according to claim 1 wherein such compound is O,O-diethyl-O-[1-(O',O'-diethyl-thionophosphoryl)-5-methyl- pyrazol-3-yl]-thionophosphoric acid ester of the formula

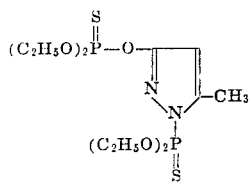

7. Compound according to claim 1 wherein such compound is phenyl-O-ethyl-O-[1-(methyl-O'-ethyl-thionophosphonyl)-5-methyl-pyrazol--thionophosphonic acid ester of the formula

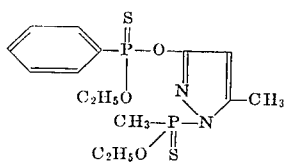

8. Compound according to claim 1 wherein such compound is ethyl-O-ethyl-O-[1-(O',O'-diethyl-phosphoryl)-5-methyl- pyrazol-3-yl]-thionophosphonic acid ester of the formula

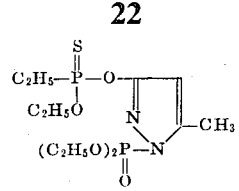

9. Compound according to claim 1 wherein such compound is O,O-diethyl-O-[1-O',O'-diethyl-phosphoryl)-5-methyl-pyrazol-3-yl]-phosphoric acid ester of the formula

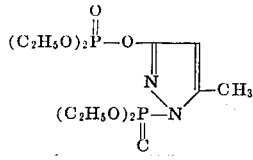

10. Compound according to claim 1 wherein such compound is O,O-diethyl-O-[1-(phenyl-O'-ethyl-thionophosphonyl)-5-methyl-pyrazol-3-yl]-thionophosphoric acid ester of the formula

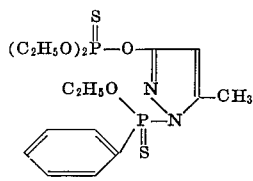

* * * * *